(12) United States Patent
Baudart et al.

(10) Patent No.: US 12,085,785 B2
(45) Date of Patent: Sep. 10, 2024

(54) METHOD FOR DETERMINING PROCESS PARAMETERS FOR MANUFACTURING AT LEAST PART OF AN EYEGLASS AND EYEGLASS MANAGING SYSTEM

(71) Applicant: ESSILOR INTERNATIONAL, Charenton-le-Pont (FR)

(72) Inventors: Thierry Baudart, Charenton-le-Pont (FR); Maggy Perrier, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 642 days.

(21) Appl. No.: 17/293,374

(22) PCT Filed: Nov. 12, 2019

(86) PCT No.: PCT/EP2019/081062
§ 371 (c)(1),
(2) Date: May 12, 2021

(87) PCT Pub. No.: WO2020/099429
PCT Pub. Date: May 22, 2020

(65) Prior Publication Data
US 2022/0004024 A1  Jan. 6, 2022

(30) Foreign Application Priority Data
Nov. 14, 2018  (EP) ..................................... 18315040

(51) Int. Cl.
*G02C 7/02* (2006.01)
*G02C 13/00* (2006.01)
*G02C 5/12* (2006.01)

(52) U.S. Cl.
CPC ............. *G02C 7/027* (2013.01); *G02C 7/028* (2013.01); *G02C 13/005* (2013.01); *G02C 5/12* (2013.01)

(58) Field of Classification Search
CPC ...... G02C 7/027; G02C 7/028; G02C 13/005; G02C 5/12; G02C 7/022; B29D 11/00028; B29D 11/00432; B29D 12/02
(Continued)

(56) References Cited

U.S. PATENT DOCUMENTS 11,069,153 B1 * 7/2021 Bassett .................. G06T 19/20
11,822,152 B2 * 11/2023 Quere .................... B33Y 80/00
(Continued)

FOREIGN PATENT DOCUMENTS

| EP | 3 214 595 A1 | 9/2017 |
|---|---|---|
| WO | 2017/149180 A1 | 9/2017 |
| WO | 2017/196948 | 11/2017 |

OTHER PUBLICATIONS

International Search Report for PCT/EP2019/081062 mailed Feb. 10, 2020, 4 pages.
(Continued)

*Primary Examiner* — Tuyen Tra
(74) *Attorney, Agent, or Firm* — NIXON & VANDERHYE

(57) ABSTRACT

An eyeglass managing system determines process parameters for manufacturing at least part of an eyeglass including a lens and a frame. In this eyeglass managing system, an electronic system includes: —a receiving unit adapted to acquire lens data describing an initial lens and frame data describing an initial frame; —a processing unit adapted to identify, based on the lens data and on the frame data, modification parameters deriving from the interaction between the initial lens and the initial frame; and—a trans-
(Continued)

Figure 1:
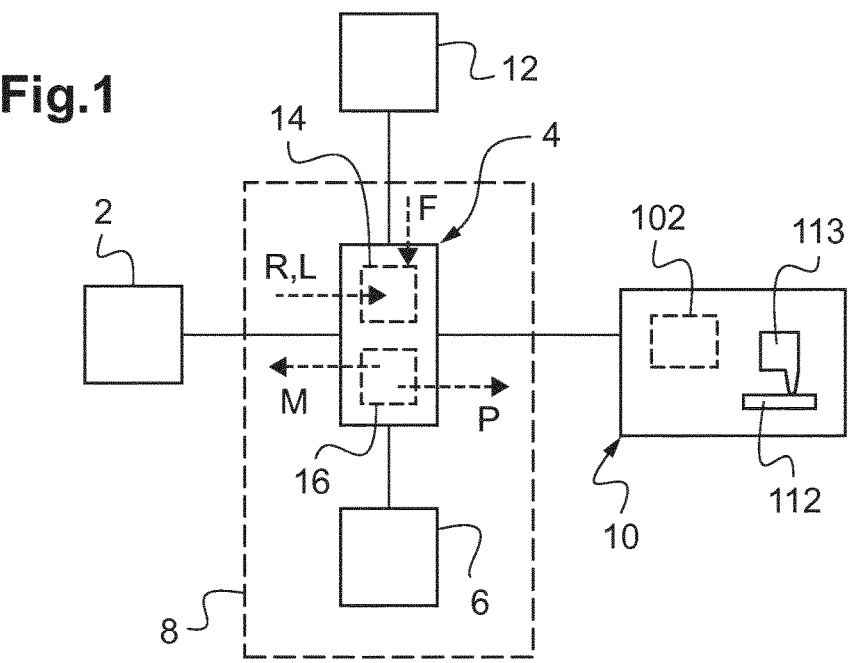

mitting unit adapted to transmit a list of proposed modifications based on the identified modification parameters. The receiving unit is further adapted to acquire a response to at least one proposed modification; the processing unit is further adapted to determine, based on the acquired response, process parameters of an additive manufacturing process for manufacturing the lens or the frame.

16 Claims, 1 Drawing Sheet

(58) Field of Classification Search
USPC .................. 359/41, 159.01, 159.73, 159.74
See application file for complete search history.

(56) References Cited

U.S. PATENT DOCUMENTS

| | | |
|---|---|---|
| 2015/0061166 A1 | 3/2015 | Van De Vrie et al. |
| 2015/0277155 A1 | 10/2015 | Raviv |
| 2016/0114542 A1 | 4/2016 | Quere et al. |
| 2016/0124246 A1 | 5/2016 | Rego et al. |
| 2017/0038767 A1 | 2/2017 | Cluckers et al. |
| 2018/0017815 A1 | 1/2018 | Chumbley et al. |

OTHER PUBLICATIONS

Written Opinion of the ISA for PCT/EP2019/081062 mailed Feb. 10, 2020, 8 pages.

* cited by examiner

METHOD FOR DETERMINING PROCESS PARAMETERS FOR MANUFACTURING AT LEAST PART OF AN EYEGLASS AND EYEGLASS MANAGING SYSTEM

This application is the U.S. national phase of International Application No. PCT/EP2019/081062 filed Nov. 12, 2019 which designated the U.S. and claims priority to EP Patent Application No. 18315040.8 filed Nov. 14, 2018, the entire contents of each of which are hereby incorporated by reference.

TECHNICAL FIELD OF THE INVENTION

The invention relates to the production of eyeglasses comprising a frame and at least one lens.

More precisely the invention relates to a method for determining process parameters for manufacturing at least part of an eyeglass and to an eyeglass managing system.

BACKGROUND INFORMATION AND PRIOR ART

Nowadays, a future wearer of eyeglasses selects a frame at an eye care practitioner. Lenses providing the wearer's necessary correction are then edged to the shape of the frame so as to be mounted in the selected frame.

The final eyeglasses (and the interaction between the frame and each lens, in particular) are thus driven by the frame selected and the wearer has no option but accepting the choices made by the frame designer, for instance in terms of the way the frame and lenses interact.

SUMMARY OF THE INVENTION

The invention provides a method for determining process parameters for manufacturing at least part of an eyeglass comprising a lens and a frame, said method comprising the followings steps implemented in an electronic system:
  acquiring lens data describing an initial lens;
  acquiring frame data describing an initial frame;
  identifying, based on the lens data and on the frame data, modification parameters deriving from the interaction between the initial lens and the initial frame;
  transmitting a list of proposed modifications based on the identified modification parameters;
  acquiring a response to at least one proposed modification;
  based on the acquired response, determining process parameters of an additive manufacturing process for manufacturing the lens or the frame.

Some modifications deriving from the interaction between the initial lens and the initial frame can thus be selected (for instance by the future wearer of the eyeglass) and an additive manufacturing process can be launched using the determined process parameters, taking into account the selected modifications.

The eyeglass thus obtained will have an improved interaction between the lens and the frame, while modifications are under control thanks to the selection made (e.g. by the future wearer) in the response.

According to a possible embodiment, the step of acquiring frame data may comprise the followings sub-steps:
  receiving a frame reference from an end-user system (for instance located at the eye care practitioner);
  transmitting the frame reference to a frame designer electronic system;
  receiving said frame data from the frame designer electronic system in response to the transmitted frame reference.

The method defined above may also comprise the steps of:
  receiving data describing user feedback on the frame or the proposed modifications;
  transmitting said data to a frame designer electronic system.

The method may in some embodiments further comprise a step of receiving data defining a modified frame from the designer electronic system. In such a situation, the designer electronic system may implement the modifications to the frame as defined in the data described the proposed modifications. In practice, the list of proposed modifications may be transmitted to a remote system including a screen; the remote system may then be adapted to control the screen to display a representation of a modified eyeglass comprising the initial lens and the initial frame, and modified by at least one of said modifications.

According to a possible embodiment, the step of identifying modification parameters includes the following sub-steps:
  based on a model of the mechanical interface between the initial lens and the initial frame, determining an improvable characteristic among the following characteristics: mechanical interference between the initial frame and the initial lens, contact between an edge of the lens and a rim of the frame, field of view provided by the initial lens if mounted in the initial frame;
  selecting parameters leading to an improvement of the improvable characteristic when used as modification parameters.

The modification parameters may in practice include at least one of the following parameters: lens edge thickness, frame rim thickness, shape of beveled edge of the lens, shape of beveled edge of the rim, type of nose pad of the frame, position of the nose pad of the frame, type of branch of the frame, position of the hinge of the branch of the frame, shape of the lens, inner shape of the rim of the frame.

The method defined above may also comprise a further step of producing the lens or the frame, wherein the produced lens or frame includes a proposed modification defined as accepted in the acquired response. The lens or the frame is for instance produced by additive manufacturing using the determined process parameters.

The invention also provides an eyeglass managing system adapted to determine process parameters for manufacturing at least part of an eyeglass comprising a lens and a frame, comprising an electronic system comprising:
  a receiving unit adapted to acquire lens data describing an initial lens and frame data describing an initial frame;
  a processing unit adapted to identify, based on the lens data and on the frame data, modification parameters deriving from the interaction between the initial lens and the initial frame; and
  a transmitting unit adapted to transmit a list of proposed modifications based on the identified modification parameters.

The receiving unit may be further adapted to acquire a response to at least one proposed modification; the processing unit may be further adapted to determine, based on the acquired response, process parameters of an additive manufacturing process for manufacturing the lens or the frame.

Such a system may also comprise a manufacturing machine adapted to produce the lens or the frame; the produced lens or frame can then include a proposed modification defined as accepted in the acquired response.

As noted above, this manufacturing machine may be an additive manufacturing machine adapted to produce the lens or the frame using the determined process parameters.

DETAILED DESCRIPTION OF EXAMPLE(S)

The following description, given with regard to the appended drawings, which are given by way of non-limiting examples, will allow what the invention consists of and how it can be carried out to be better understood.

Figure 2:
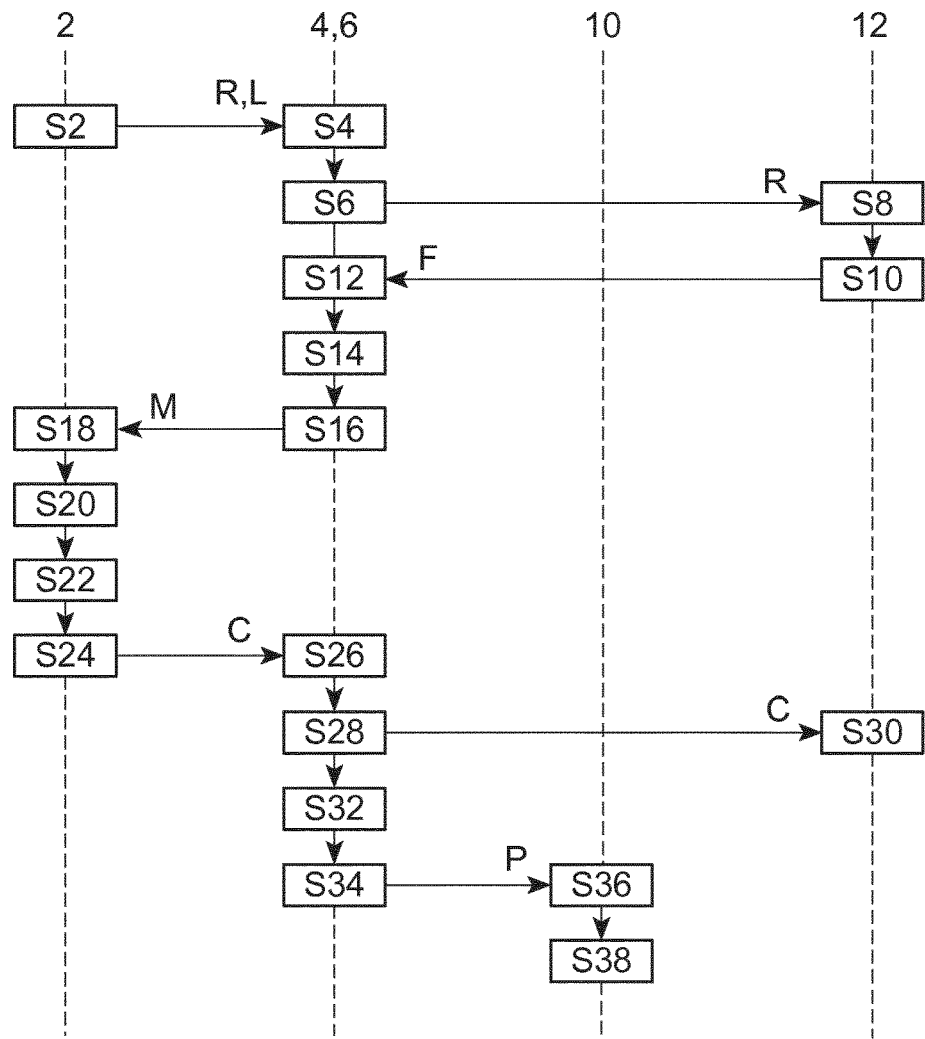

In the appended drawings:

FIG. 1 shows an example of an eyeglass managing system according to the invention; and FIG. 2 is a diagram showing the main steps of an example of a method for determining process parameters according to the invention.

The eyeglass managing system shown in FIG. 1 comprises an ECP device 2 (where ECP stands for "Eye Care Practitioner"), an electronic system 8, an additive manufacturing machine 10 and a frame designer electronic system 12 storing a frame database.

The electronic system 8 comprises a communication circuit 4 and a processing unit 6.

The communication circuit 4 can establish connections with other electronic devices (such as the ECP device 2 and/or the additive manufacturing machine 10 and/or the frame designer electronic system 12) via one or several electronic network(s) (possibly including a wide area network such as the Internet) so that the processing unit 6 may exchange data with these other electronic devices.

In particular, the communication circuit 4 includes a receiving unit 14 for receiving data intended for the processing unit 6 from another electronic device, and a transmitting unit 16 for transmitting data from the processing unit 6 to another electronic device.

At least some of the connections established by the communication circuit 4 with another device may in practice be secured (for instance by being implemented through a secure channel and/or by being encrypted).

The processing unit 6 may typically include in practice a microprocessor and a memory (such as a random memory and/or a non-volatile memory). The memory stores in particular program instructions suitable for controlling the processing unit 6 to perform the steps implemented by the processing unit 6 as described below with reference to FIG. 2, when these program instructions are executed by the microprocessor. The memory may also store (at least temporarily) data processed by the processing unit 6 during any of the steps implemented by the processing unit 6 as described below with reference to FIG. 2.

The ECP device 2 is an electronic device, such as a computer (for instance a personal computer or a tablet computer), located for instance in the premises of an eye care practitioner and meant to store (at least temporarily) lens data L describing an initial ophthalmic lens and a frame reference R.

Such data L describing the initial ophthalmic lens include for instance prescription data defining at least a refractive correction to be provided by the initial ophthalmic lens, such as a spherical refractive power and/or a cylindrical refractive power and/or a cylinder axis of the cylindrical correction.

Data L describing the initial ophthalmic lens may also include further data defining the initial ophthalmic lens, such as:

data defining the type of the initial ophthalmic lens (e.g. among a single vision type, a progressive type, a multifocal type); and/or data defining design characteristics of the initial ophthalmic lens, such as whether the lens is spherical or aspherical for a single vision lens, a distribution of residual spherical power and/or unwanted astigmatism for a progressive addition lens, a type of the lens (bifocal, trifocal, segment type) and a size of the addition area for a multifocal lens; and/or data defining the material of the initial ophthalmic lens.

Data L describing the initial ophthalmic lens are for instance determined based on a prescription made by an ophthalmologist (after examination of the vision of the future wearer of the initial ophthalmic lens) and/or entered in the ECP device 2 (to be at least temporarily stored therein) via a user interface of the ECP device 2.

The frame reference R is for instance an identifier of an initial frame that has been chosen beforehand in the ECP premises by the future wearer of the eyeglass.

The frame database (stored by the frame designer electronic system 12 as indicated above) includes frame data F (such as a file containing a 3D representation of the concerned frame) in association with the frame reference F for the concerned frame. The frame database may in practice store frame data F for each of a plurality of frames designed by the concerned frame designer.

The additive manufacturing machine 10 comprises a control unit 102 and a manufacturing supporting member 112 on which at least a portion of the eyeglass (for instance the ophthalmic lens and/or the frame) will be manufactured by means of an additive manufacturing method.

The manufacturing supporting member 112 comprises a body provided with a manufacturing surface that has an overall geometry, all or some of which is independent or dependent on the geometry of at least one surface of the ophthalmic lens and/or the frame to be produced by additive manufacturing. In the example described here, the manufacturing surface is flat; as a variant, it could for example be convex or concave.

In the present example, the additive manufacturing machine 10 also comprises at least one nozzle 113. The additive manufacturing technology used in the additive manufacturing machine 10 may in this case be polymer jetting, for instance.

The nozzle 113 is controlled by the control unit 102 so as to be moved by actuators and to deliver elementary volumes (or voxels) of a material that will form, after an optional additional treatment (such as a photo-polymerization step), elementary portions of the portion of the eyeglass (e.g. the ophthalmic lens and/or the frame) being manufactured.

According to possible variations however, other additive manufacturing technologies may be used, such as for instance stereo-lithography (SLA), possibly DLP-SLA (DLP standing for "Digital Light Processing"). In the case of DLP-SLA for example, a vat contains a resin which is selectively illuminated by a projector. Only parts of the resin receiving light from the projector polymerize; voxels are thus respectively formed where light is projected by the projector (e.g. by one micro-mirror of the projector), i.e. in correspondence with pixels of a matrix of the projector. In such a case in particular, the additive manufacturing machine does not therefore include a nozzle.

The control unit 102 is provided with a data processing system, especially comprising a microprocessor and a (e.g. non-volatile) memory (here a read-only memory or ROM integrated). Such a memory stores computer program instructions (forming a software) which, when executed by the microprocessor, allows the additive manufacturing machine 10 to be controlled and thus the additive manufacturing method to be implemented.

The control unit 102 furthermore comprises a modifiable memory, here a volatile random access memory (RAM), in which the data used during the execution of the software and implementation of the additive manufacturing method are stored.

As a variant, the non-volatile memory and/or the modifiable memory could be a rewritable non-volatile memory, for example an electrically erasable programmable read-only memory (EEPROM).

When producing the portion of the eyeglass (e.g. the ophthalmic lens and/or the frame), the modifiable memory especially stores corresponding process parameters P, as further described below.

The invention is not limited to a particular location of the additive manufacturing machine 10.

For instance, as schematically shown in FIG. 1, the additive manufacturing machine 10 could be located in premises distinct from the ECP premises and from a location of the electronic system 8.

According to a possible variation, the additive manufacturing machine 10 and the electronic system 8 could be located in the same building (the manufacturing machine 10 and the electronic system 8 being part of a lab, for instance).

According to yet another solution the additive manufacturing machine 10 could be located in the ECP premises.

FIG. 2 shows the main steps of a method for determining process parameters P according to the invention.

The method of FIG. 2 begins after selection of an initial frame (having a frame reference R) by a wearer in the ECP premises.

The frame reference R and lens data L describing an initial lens suitable for correcting the wearer's ametropia are entered in the ECP device 2 and stored (at least temporarily) in a memory of the ECP device 2.

Possible types of lens data L are described above.

The frame reference R and lens data L may thus be transmitted from the ECP device 2 to the electronic system 8 (step S2). Additional data may also be transmitted at step S2, such as data describing the shape of the face of the future wearer (obtained for instance by face scanning at the ECP premises) and data describing equipment available in the ECP premises (e.g. when edging and mounting is to be done by the ECP).

The frame reference R and lens data L (as well as possibly additional data as just mentioned) are received by the receiving unit 14 (and thus by the processing unit 6) at step S4.

The processing unit 6 has thus acquired lens data L describing the initial lens and stores these lens data L in the memory of the processing unit 6.

In the present example, as just mentioned, the frame reference R and lens data L are received from an ECP device. In other embodiments, the frame reference R and/or the lens data L could be received by another end-user system, such as for instance a personal computer (whereon the wearer may have chosen the initial frame by accessing a dedicated website and/or input prescription data forming the lens data L).

In the method of FIG. 2, the processing unit 6 then transmits (step S6) the frame reference R to the frame designer electronic system 12, by use of the transmitting unit 16.

The frame designer electronic system 12 receives the frame reference R and retrieves frame data F associated with this frame reference R in the frame database (step S8).

As noted above, frame data F are for instance a file containing a 3D representation of the initial frame.

The retrieved frame data F are then transmitted to the processing unit 6 by the frame designer electronic system 12 (step S10).

The receiving unit 14, and as a consequence the processing unit 6, thus receive the frame data F from the frame designer electronic system 12 at step S12.

The processing unit 6 can then use the lens data L and the frame data F (and possibly additional data as mentioned above) to identify modification parameters deriving from the interaction between the initial lens and the initial frame (step S14).

The identification of modification parameters of step S14 may for instance be performed as follows:
- a 3D representation of the initial lens is generated based on the lens data L;
- a model of the mechanical interface between the initial lens and the initial frame is constructed using this 3D representation of the initial lens and the 3D representation of the frame contained in the frame data F;
- at least one improvable characteristic is determined based on this model;
- parameters leading to an improvement of the improvable characteristic when used as modification parameters are selected as identified modification parameters.

The improvable characteristic(s) may be one or several of the following characteristics: mechanical interference between the initial frame and the initial lens, contact between an edge of the lens and a rim of the frame, field of view provided by the initial lens if mounted in the initial frame.

The possible modification parameters leading to an improvement of the improvable characteristic include at least one of the following parameters: lens edge thickness, frame rim thickness, shape of beveled edge of the lens, shape of beveled edge of the rim, type of nose pad of the frame, position of the nose pad of the frame, type of branch of the frame, position of the hinge of the branch of the frame, shape of the lens, inner shape of the rim of the frame.

The processing unit 6 can thus determine a list of proposed modifications M based on the modification parameters identified in step S14. Proposed modifications M correspond each to a modified value for one of the identified modification parameters, this modified value being different than the value of the concerned identified modification parameter in the initial lens or frame.

For instance, an improvable characteristic may be the difference in thickness between the lens edge and the frame rim; the modification parameter can then be the frame rim thickness and/or the lens edge thickness (as well as possibly the shape of the lens and/or the inner shape of the rim of the frame).

In another example, an improvable characteristic may be the lens edge thickness in order to have a sufficient lens edge thickness to hold the lens in the frame; the modification parameter is then the lens edge thickness.

According to another possibility, an improvable characteristic may be the fitting between the frame and the lens using bevels; the modification parameters are then the shape of the beveled edge of the lens and/or the shape of the beveled edge of the rim. The proposed modification M results in a beveled edge of the lens exactly corresponding to (i.e. mating) the beveled edge of the rim.

According to a possible embodiment, an improvable characteristic may be the field of view provided by the eyeglass; the modification parameters are then the shape of the lens and the inner shape of the rim of the frame.

The processing unit 6 transmits the list of proposed modifications M to a remote system, here the ECP device 2, using the transmitting unit 16 (step S16).

The list of proposed modifications M is thus received by the remote system (here the ECP device 2) at step S18.

The remote system (here the ECP device 2) may include a screen and be adapted to control the screen to display a representation of a modified eyeglass (step S20) for presentation to the future wearer of the eyeglass.

This modified eyeglass comprises the initial lens and the initial frame, with the modifications as defined in the list of proposed modifications M.

According to a possible embodiment, a user (for instance the future wearer or the eye care professional) may select (using a user interface of the remote system) some modifications in the list of proposed modifications M and the displayed modified eyeglass may then comprise the initial lens and the initial frame with only the selected modifications.

In the present example, the remote system is the ECP device 2. However, in other embodiments, the remote system may be a personal computer situated elsewhere than in the ECP premises. The remote system may for instance be a personal computer belonging to the future wearer of the eyeglass.

The user of the remote system may then select, for each modification of the list of proposed modifications M, whether he/she accepts or refuses the concerned modification (step S22). Selection is for instance performed on a user interface of the remote system, here the ECP device 2

The remote system (here the ECP device 2) can thus transmit to the processing unit 6 a response C indicating, for each proposed modification M, whether the concerned modification is accepted or refused. Possibly, data describing user feedback on the frame (such as a rating of the esthetic of the frame) may be included in the response C.

The processing unit 6 receives (via the receiving unit 14) the response C indicating, for each proposed modification M, whether the concerned modification is accepted or refused (step S26). The response C may also include data describing user feedback on the frame, as just noted.

The processing unit 6 has thus acquired (and stored, at least temporarily) the response C indicating, for each proposed modification M, whether the concerned modification is accepted or refused.

At least part of the response C (for instance accepted or refused modifications concerning the frame and/or data describing user feedback on the frame) may then be transmitted to the frame designer electronic system 12 (step S28).

The transmitted part of the response C is received by the frame designer electronic system 12 at step S30. The frame designer can thus take into account the user feedback when designing new frames.

In some embodiments, the frame designer electronic system 12 may take into account the accepted modifications defined in the response C to produce data defining a modified frame (i.e. a frame corresponding to the initial frame but modified per the accepted modifications). In these embodiments, changes to the frame are thus managed by the frame designer.

Data defining the modified frame are in this case transmitted by the frame designer electronic system 12 to the processing unit 6 for future production of the frame by additive manufacturing as explained below. Data defining the modified frame are thus received by the processing unit (via the receiving unit 14).

The processing unit 6 then uses the acquired response C in step S32 (and possibly the data defining the modified frame received from the frame designer electronic system 12) to determine process parameters P of the additive manufacturing process to be implemented for manufacturing the lens and/or the frame.

In this goal, the processing unit 6 may for instance proceed as follows:
- construct a modified 3D representation of the lens based on the 3D representation of the initial lens (see above) with possible modifications based on the accepted modifications of the lens as defined in the response C;
- construct a modified 3D representation of the frame based on the 3D representation of the initial frame (contained in the frame data F) with possible modifications based on the accepted modifications of the frame defined in the response C (or, in the embodiments described above, use the data defining the modified frame as the modified 3D representation of the frame);
- determine the process parameters P suitable for producing by additive manufacturing an object having the shape defined in the modified 3D representation of the frame and/or an object having the shape defined in the modified 3D representation of the lens.

Process parameters P include for instance any of the following parameters: the number of layers of voxels to be formed (e.g. deposited), the thickness of layers of voxels to be formed (e.g. deposited), the positioning of each voxel to be formed (e.g. deposited), the material of voxels (or of each voxel) to be formed (e.g. deposited), the type and/or amount of energy used for polymerizing the voxels, the description of a post processing step (such as post-curing, polishing or coating) to be performed.

The determined process parameters P are then transmitted to the additive manufacturing machine 10 by use of the transmitting unit 16 (step 34).

The process parameters P are thus received by the additive manufacturing machine 10 and stored (at least temporarily) in the memory of the control unit 102 (step S36).

The additive manufacturing machine 10 can then produce the lens and/or the frame by additive manufacturing (step S38) using the process parameters P.

Specifically, in the present case, the control unit 102 controls the nozzle 113 to be moved and/or to deliver material forming voxels based in particular on the process parameters P. In possible alternative embodiments mentioned above where DLP-SLA is used, the control unit 102 controls light illuminated from the projector to form voxels based on the process parameters.

As explained above, the process parameters P have been determined taking into account the modifications accepted as indicated in the acquired response C, and the produced lens and/or frame therefore include the proposed modification(s) defined as accepted in the acquired response C.

The invention claimed is:

1. A method for manufacturing at least part of an eyeglass comprising a lens and a frame, said method comprising the followings steps implemented in an electronic system:
   acquiring lens data describing an initial lens;
   acquiring frame data describing an initial frame;
   identifying, based on the lens data and on the frame data, modification parameters deriving from the interaction between the initial lens and the initial frame;

transmitting a list of proposed modifications based on the identified modification parameters;

acquiring a response to at least one proposed modification;

based on the acquired response, determining process parameters of an additive manufacturing process for manufacturing the lens or the frame, wherein said method d further comprises producing the lens or the frame using an additive manufacturing machine using the determined process parameters and wherein the produced lens or frame includes a proposed modification defined as accepted in the acquired response.

2. The method of claim 1, wherein the step of acquiring frame data comprises the followings sub-steps:

receiving a frame reference from an end-user system;

transmitting the frame reference to a frame designer electronic system;

receiving said frame data from the frame designer electronic system in response to the transmitted frame reference.

3. The method of claim 2, wherein the list of proposed modifications is transmitted to a remote system including a screen and wherein the remote system is adapted to control the screen to display a representation of a modified eyeglass comprising the initial lens and the initial frame, and modified by at least one of said modifications.

4. The method of claim 2, wherein the step of identifying modification parameters includes the following sub-steps:

based on a model of the mechanical interface between the initial lens and the initial frame, determining an improvable characteristic among the following characteristics: mechanical interference between the initial frame and the initial lens, contact between an edge of the lens and a rim of the frame, field of view provided by the initial lens if mounted in the initial frame;

selecting parameters leading to an improvement of the improvable characteristic when used as modification parameters.

5. The method of claim 2, wherein the modification parameters include at least one of the following parameters: lens edge thickness, frame rim thickness, shape of beveled edge of the lens, shape of beveled edge of the rim, type of nose pad of the frame, position of the nose pad of the frame, type of branch of the frame, position of the hinge of the branch of the frame, shape of the lens, inner shape of the rim of the frame.

6. The method of claim 1, further comprising the steps of:

receiving data describing user feedback on the frame or the proposed modifications;

transmitting said data to a frame designer electronic system.

7. The method of claim 6, further comprising a step of receiving data defining a modified frame from the designer electronic system.

8. The method of claim 7, wherein the list of proposed modifications is transmitted to a remote system including a screen and wherein the remote system is adapted to control the screen to display a representation of a modified eyeglass comprising the initial lens and the initial frame, and modified by at least one of said modifications.

9. The method of claim 4, wherein the step of identifying modification parameters includes the following sub-steps:

based on a model of the mechanical interface between the initial lens and the initial frame, determining an improvable characteristic among the following characteristics: mechanical interference between the initial frame and the initial lens, contact between an edge of the lens and a rim of the frame, field of view provided by the initial lens if mounted in the initial frame;

selecting parameters leading to an improvement of the improvable characteristic when used as modification parameters.

10. The method of claim 6, wherein the list of proposed modifications is transmitted to a remote system including a screen and wherein the remote system is adapted to control the screen to display a representation of a modified eyeglass comprising the initial lens and the initial frame, and modified by at least one of said modifications.

11. The method of claim 6, wherein the step of identifying modification parameters includes the following sub-steps:

based on a model of the mechanical interface between the initial lens and the initial frame, determining an improvable characteristic among the following characteristics: mechanical interference between the initial: frame and the initial lens, contact between an edge of the lens and a rim of the frame, field of view provided by the initial lens if mounted in the initial frame;

selecting parameters leading to an improvement of the improvable characteristic when used as modification parameters.

12. The method of claim 1, wherein the list of proposed modifications is transmitted to a remote system including a screen and wherein the remote system is adapted to control the screen to display a representation of a modified eyeglass comprising the initial lens and the initial frame, and modified by at least one of said modifications.

13. The method of claim 12, wherein the step of identifying modification parameters includes the following sub-steps:

based on a model of the mechanical interface between the initial lens and the initial frame, determining an improvable characteristic among the following characteristics: mechanical interference between the initial frame and the initial lens, contact between an edge of the lens and a rim of the frame, field of view provided by the initial lens if mounted in the initial frame;

selecting parameters leading to an improvement of the improvable characteristic when used as modification parameters.

14. The method of claim 1, wherein the step of identifying modification parameters includes the following sub-steps:

based on a model of the mechanical interface between the initial lens and the initial frame, determining an improvable characteristic among the following characteristics: mechanical interference between the initial frame and the initial lens, contact between an edge of the lens and a rim of the frame, field of view provided by the initial lens if mounted in the initial frame;

selecting parameters leading to an improvement of the improvable characteristic when used as modification parameters.

15. The method of claim 1, wherein the modification parameters include at least one of the following parameters: lens edge thickness, frame rim thickness, shape of beveled edge of the lens, shape of beveled edge of the rim, type of nose pad of the frame, position of the nose pad of the frame, type of branch of the frame, position of the hinge of the branch of the frame, shape of the lens, inner shape of the rim of the frame.

16. An eyeglass managing system adapted to determine process parameters for manufacturing at least part of an eyeglass comprising a lens and a frame, comprising an electronic system comprising:

a receiving unit adapted to acquire lens data describing an initial lens and frame data describing an initial frame;

a processing unit adapted to identify, based on the lens data and on the frame data, modification parameters deriving from the interaction between the initial lens and the initial frame; and a transmitting unit adapted to transmit a list of proposed modifications based on the identified modification parameters, wherein the receiving unit is further adapted to acquire a response to at least one proposed modification and wherein the processing unit is further adapted to determine, based on the acquired response, process parameters of an additive manufacturing process for manufacturing the lens or the frame, wherein the eyeglass managing system further comprises a manufacturing machine adapted to produce the lens or the frame, wherein the produced lens or frame includes a proposed modification defined as accepted in the acquired response, and wherein the manufacturing machine is an additive manufacturing machine adapted to produce the lens or the frame using the determined process parameters.

* * * * *